United States Patent
Nakano et al.

(10) Patent No.: US 6,741,837 B1
(45) Date of Patent: May 25, 2004

(54) INTERFERENCE AVOIDANCE RADIO COMMUNICATIONS SYSTEM

(75) Inventors: Etsuhiro Nakano, Kanagawa (JP); Yoshihiro Ishikawa, Kanagawa (JP); Masafumi Hata, Kanagawa (JP); Minami Ishii, Kanagawa (JP); Seizo Onoe, Kanagawa (JP)

(73) Assignee: NTT Mobile Communications Network, Inc., Tokyo (JP)

( * ) Notice: Subject to any disclaimer, the term of this patent is extended or adjusted under 35 U.S.C. 154(b) by 0 days.

(21) Appl. No.: 09/364,938

(22) Filed: Jul. 30, 1999

Related U.S. Application Data

(63) Continuation of application No. PCT/JP99/02618, filed on May 19, 1999.

(30) Foreign Application Priority Data

May 20, 1998 (JP) .......................................... 10-139026

(51) Int. Cl.[7] .............................................. H04B 17/00
(52) U.S. Cl. .................. 455/67.1; 455/63; 455/425; 375/227
(58) Field of Search ................................ 455/422, 423, 455/424, 448, 13.4, 500, 501, 63, 67.1, 67.3, 1, 62, 456, 457, 92, 117, 440; 370/252; 375/144, 148, 224, 225, 226, 227, 285, 346, 348

(56) References Cited

U.S. PATENT DOCUMENTS

| | | | | | |
|---|---|---|---|---|---|
| 5,430,761 A | * | 7/1995 | Bruckert et al. | ............ | 375/144 |
| 5,437,054 A | * | 7/1995 | Rappaport et al. | .......... | 455/447 |
| 5,537,443 A | * | 7/1996 | Yoshino et al. | ............. | 375/340 |
| 5,596,570 A | * | 1/1997 | Soliman | ..................... | 370/252 |
| 5,740,536 A | | 4/1998 | Benveniste | ................. | 455/447 |
| 5,857,143 A | | 1/1999 | Kataoka | ..................... | 455/62 |
| 5,884,181 A | * | 3/1999 | Arnold et al. | .............. | 455/450 |
| 5,926,762 A | * | 7/1999 | Arpee et al. | ................ | 455/447 |
| 6,081,728 A | * | 6/2000 | Stein et al. | ................. | 455/523 |

FOREIGN PATENT DOCUMENTS

| | | |
|---|---|---|
| JP | 3-89636 | 4/1991 |
| JP | 9-224283 | 8/1997 |
| JP | 9-233536 | 9/1997 |

\* cited by examiner

*Primary Examiner*—Vivian Chin
*Assistant Examiner*—Charles Craver
(74) *Attorney, Agent, or Firm*—Brown Raysman Millstein Felder & Steiner LLP

(57) ABSTRACT

A base station 422 of a second system performs communication using a frequency adjacent to a frequency employed by communication between a base station 412 and a mobile station 414 of a first system. When the mobile station 414 is close to the base station 422, the communication of the base station 422 undergoes interference by the leakage power of the mobile station 414. To avoid the interference, the transmission is halted of the mobile station 414 of the first system, which provides the interference by the leakage power.

1 Claim, 18 Drawing Sheets

INTERFERENCE AVOIDANCE RADIO COMMUNICATIONS SYSTEM

This application is a continuation under 35 U.S.C. §120 and §365 of International Application No. PCT/JP99/02618, filed May 19, 1999, which in turn claims priority of Japanese Patent Application No. JP139026, filed May 20, 1998, both of which are incorporated herein by reference.

TECHNICAL FIELD

The present invention relates to an inter-radio communications system interference avoidance method applicable to the case where a plurality of radio communications systems using different frequencies are installed in the same area.

BACKGROUND ART

When a plurality of radio communications systems are installed in the same area, the frequencies assigned to them must be divided to avoid interference between their radio signals. On the other hand, transmitters for performing radio communications cannot perfectly prevent transmitted signals from leaking to the outside of their frequencies, thereby producing leakage power to the frequencies outside their own. This is illustrated in FIG. 1. As is seen from FIG. 1, although the leakage power is much smaller than the total transmission power, it can provide very large interference to adjacent frequencies depending on the locations of base stations and mobile stations. This will be described with reference to FIG. 2.

In FIG. 2, a first radio communications system 110 and a second radio communications system 120 are installed in the same area, and employ adjacent frequencies. A mobile station 114 belonging to the first radio communications system 110 is very close to a base station 122 of the second radio communications system, and transmits to a base station 112 of the first radio communications system 110 which is farther away from it than from the base station 122 of the second radio communications system 120. The mobile station 114 cannot change its belonging from the first radio communications system 110 to the second radio communications system 120 during its communication.

In this case, the leakage power even from the adjacent frequency brings about very large interference to the base station 122 of the second radio communications system 120. Because of the interference, the base station 122 of the second radio communications system 120 may be unable to receive transmitted data from a mobile station 124 of the second radio communications system 120.

In view of this, the conventional radio communications system assigns an unassigned frequency band called a guard band between the frequency bands employed by the two radio communications systems as illustrated in FIG. 3, thereby preventing the interference from taking place even in the case as shown in FIG. 2.

However, frequency resources are limited, and the guard band has a disadvantage of decreasing the frequency utility efficiency. In particular, in broadband radio communications systems such as a CDMA (Code Division Multiple Access) system, the guard bands required become broad, resulting in marked reduction in the frequency utility efficiency. On the contrary, eliminating the guard band will reduce the capacity in terms of the number of subscribers because of the interference.

DISCLOSURE OF THE INVENTION

An object of the present invention is to avoid the inter-radio communications system interference by halting the transmission of a mobile station causing the inter-radio communications system interference rather than by assigning the guard bands.

To accomplish the object of the present invention, there is provided an entire radio communications system containing at least two radio communications systems in one geographical area, each radio communication system including at least one base station and at least one mobile station, and uses different frequencies, in which a mobile station belongs to one of the radio communications systems in a communication mode, and cannot change that radio communications system during the communication mode, wherein the base station comprises means for intentionally transmitting an interfering signal at a frequency different from a frequency assigned to the base station; and the mobile station comprises means for monitoring received signal quality of a downlink channel, and means for halting its transmission when the received signal quality monitored drops below an acceptable level.

Such a configuration makes effective use of the frequencies possible because the interference between the systems is avoidable without the guard band between the frequency bands needed for the conventional radio communications systems.

Generally, the mobile station in the radio communications system has a function to terminate its communication when communication quality is degraded. Hence, the frequencies can be effective by only adding to the base station a function of transmitting an interfering signal, without adding any special control function.

The transmission of the interfering signal from the base station can be carried out by utilizing leakage power or by equipping an interfering signal transmitter.

The base station may comprise a receiver for measuring a received signal level at the adjacent frequency; and transmit the interfering signal at the adjacent frequency only when the uplink received signal level exceeds an acceptable level.

With such a configuration, since the base station performs its transmission at the adjacent frequency only when necessary, the downlink interference to the adjacent radio communications system is reduced.

Furthermore, since the base station monitors directly the frequency band causing the interference, the accuracy of the estimation of the interference is improved. As a result, the possibility of undue termination of the communication, or the possibility of causing large interference is reduced.

The base station can measure the uplink interference level at the receiving frequency band, and transmit the interfering signal at the adjacent frequency only when the uplink interference level exceeds an acceptable level.

This configuration can reduce the downlink interference to the radio communications system using the adjacent frequency because the base station carries out its transmission at the adjacent frequency only when necessary, and can obviate the necessity of providing the base station with any additional receiver because the base station makes a decision as to whether to start or terminate the transmission of the interfering signal by measuring the interference level at the frequency assigned to the base station.

According to a second aspect of the present invention, there is provided a mobile station in an entire radio communications system containing at least two radio communications systems in one geographical area, each of which includes at least one base station and at least one mobile station, and uses different frequencies, in which a mobile station belongs to one of the radio communications systems in a communication mode, and cannot change that radio communications system during the communication mode, wherein the mobile station measures a signal level of a received signal at a frequency adjacent to its own assigned frequency, and halts its transmission when the received signal level exceeds an acceptable level.

This configuration can prevent the downlink interference from being increased because the base station does not transmit any interfering signal.

In addition, since the mobile station measures the level of the adjacent frequency in a straightforward manner, the accuracy of estimating the effect of the interference increases, and the possibility of unduly terminating the communication is reduced.

The mobile station can comprise a receiver for measuring a received signal level at the adjacent frequency, and terminate its transmission when the received signal level exceeds an acceptable level.

The mobile station can also measure the received signal level at an adjacent frequency by switching its receiving frequency when reception is not required in a standby mode or communication mode, and halt its transmission when the received signal level exceeds the acceptable level.

This configuration can obviate the receiver for measuring the received signal level at the adjacent frequency, making it possible to reduce the size of the mobile station.

BEST MODE FOR CARRYING OUT THE INVENTION

The embodiments of the present invention will now be described with reference to the accompanying drawings.

Configuration of Radio Communications System

First, a radio communications system in accordance with the present invention will be described with reference to FIGS. 4–7.

Figure 4:
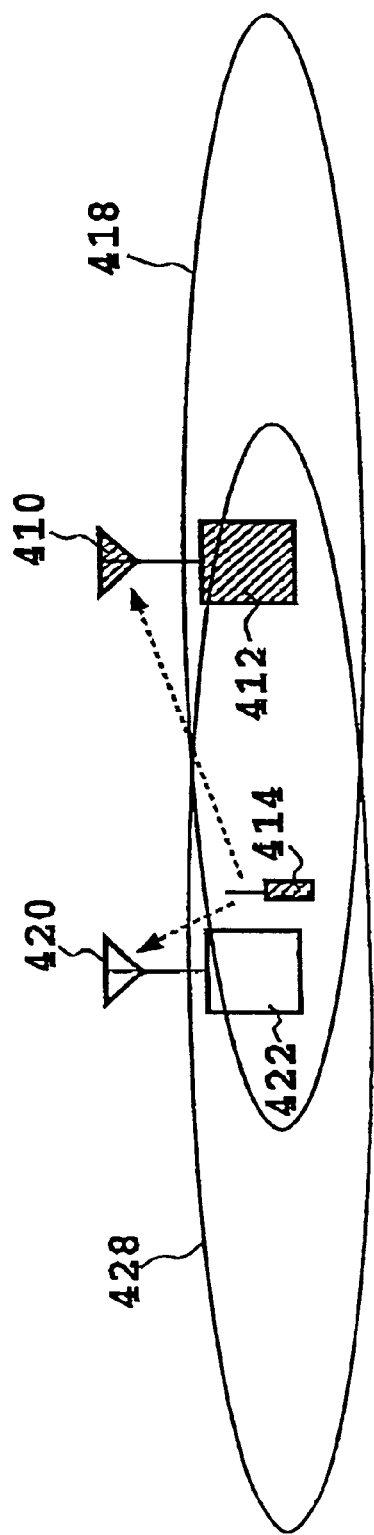
FIG. 4 is a diagram showing an overall configuration of the radio communications system in accordance with the present invention.

FIG. 4 shows the overall configuration of the radio communications system in accordance with the present invention. In FIG. 4, a base station 412 and a mobile station 414 belong to a first radio communications system 410, and a base station 422 belongs to a second radio communications system 420. Service areas 418 and 428 of the first radio communications system 410 and second radio communications system 420 overlap each other. The mobile station 414 cannot change its belonging from the first radio communications system 410 to the second radio communications system 420 during its communication.

Figure 5:
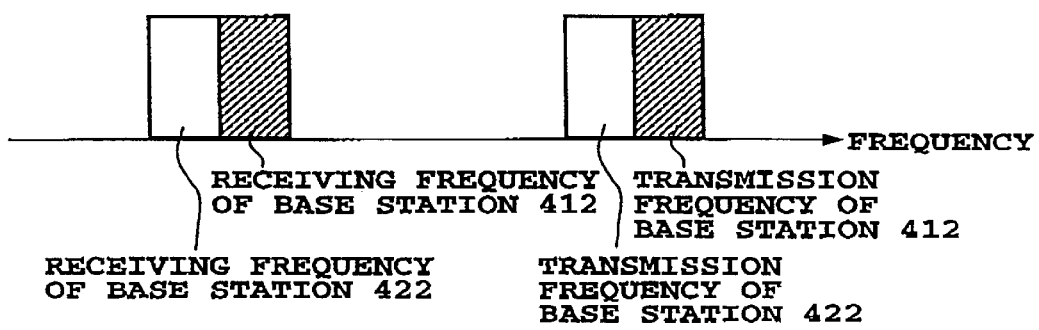
FIG. 5 is a diagram illustrating frequencies assigned to base stations of FIG. 4.

FIG. 5 illustrates transmission frequencies and receiving frequencies assigned to the base station 412 and base station 422. As illustrated in FIG. 5, adjacent transmission frequencies and adjacent receiving frequencies are allotted to the base station 412 and base station 422.

Figure 6:
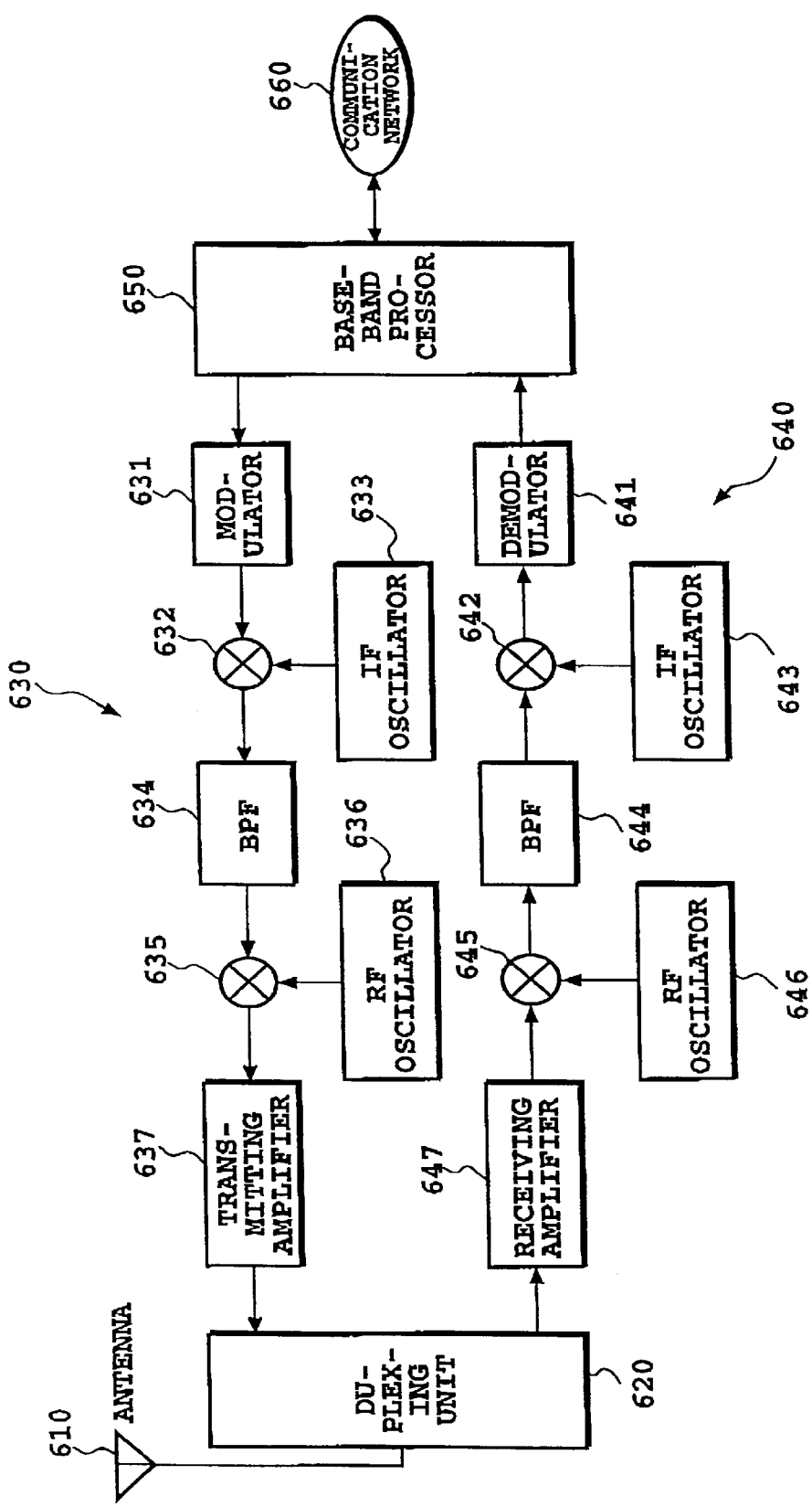
FIG. 6 is a block diagram showing a configuration of a base station in accordance with the present invention.

FIG. 6 shows an embodiment of a base station in accordance with the present invention. The base station has a function to pass on communication signals between mobile stations and a communications network, and is connected to the mobile stations by radio channels. An antenna 610 receives a radio signal transmitted by a mobile station, and transmits a radio signal to the mobile station. A duplexing unit 620, which is a directional coupler for sharing the antenna 610 between transmission and reception, has a transmission filter and a reception filter of the radio frequencies as illustrated in FIG. 5. Reference numerals 630 and 640 designate a transmitter and a receiver, respectively. A baseband processor 650 processes signals from a communications network 660 such as a public network and radio signals sent from mobile stations. The transmitter 630 comprises a modulator 631, a mixer 632, an intermediate frequency (IF) oscillator 633, a bandpass filter (BPF) 634, a mixer 635, a radio frequency (RF) oscillator 636 and a transmitting amplifier 637. The receiver 640 comprises a demodulator 641, a mixer 642, an intermediate frequency (IF) oscillator 643, a bandpass filter (BPF) 644, a mixer 645, a radio frequency (RF) oscillator 646 and a receiving amplifier 647.

The processing in the base station as shown in FIG. 6 will now be described to the point where a signal from the communications network is transmitted to the mobile station. The signal transmitted through the communication network is converted by the conventional baseband processor 650 into a baseband signal to be transmitted to the mobile station (see, T. Dohi, et al., "Further Results on Field Experiments of Coherent Wideband DS-CDMA Mobile Radio", IEICE Trans. Commun., Vol. E81-B, No. 6 June, 1998). Besides, the baseband processor 650 adds a control signal or performs error correcting code processing as needed. The baseband signal undergoes digital modulation by the modulator 631, and then converted into an IF signal by the IF oscillator 633, followed by the attenuation of signals outside the transmission band by the BPF 634, and by the conversion into a radio frequency signal by the RF oscillator 636. After that, the signal is amplified by the transmitting amplifier 637, and is transmitted through the duplexing unit 620 and antenna 610.

Next, the processing will be described up to the point where a signal from the mobile station is transmitted to the communications network. The radio signal received by the antenna 610 is fed to the duplexing unit 620 which selects only the desired receiving frequency. After amplified by the receiving amplifier 647, the received signal is converted into an IF signal by the RF oscillator 646, followed by the attenuation of frequencies outside the desired frequency by the BPF 644. Subsequently, the signal is converted by the IF oscillator 643 into a baseband signal, and then undergoes the digital demodulation by the demodulator 641. After carrying out the error correcting decoding processing and extraction of the control signal, the baseband processor 650 converts the signal into a signal to be transmitted to the communications network, and sends the signal to the communications network 660.

Figure 7:
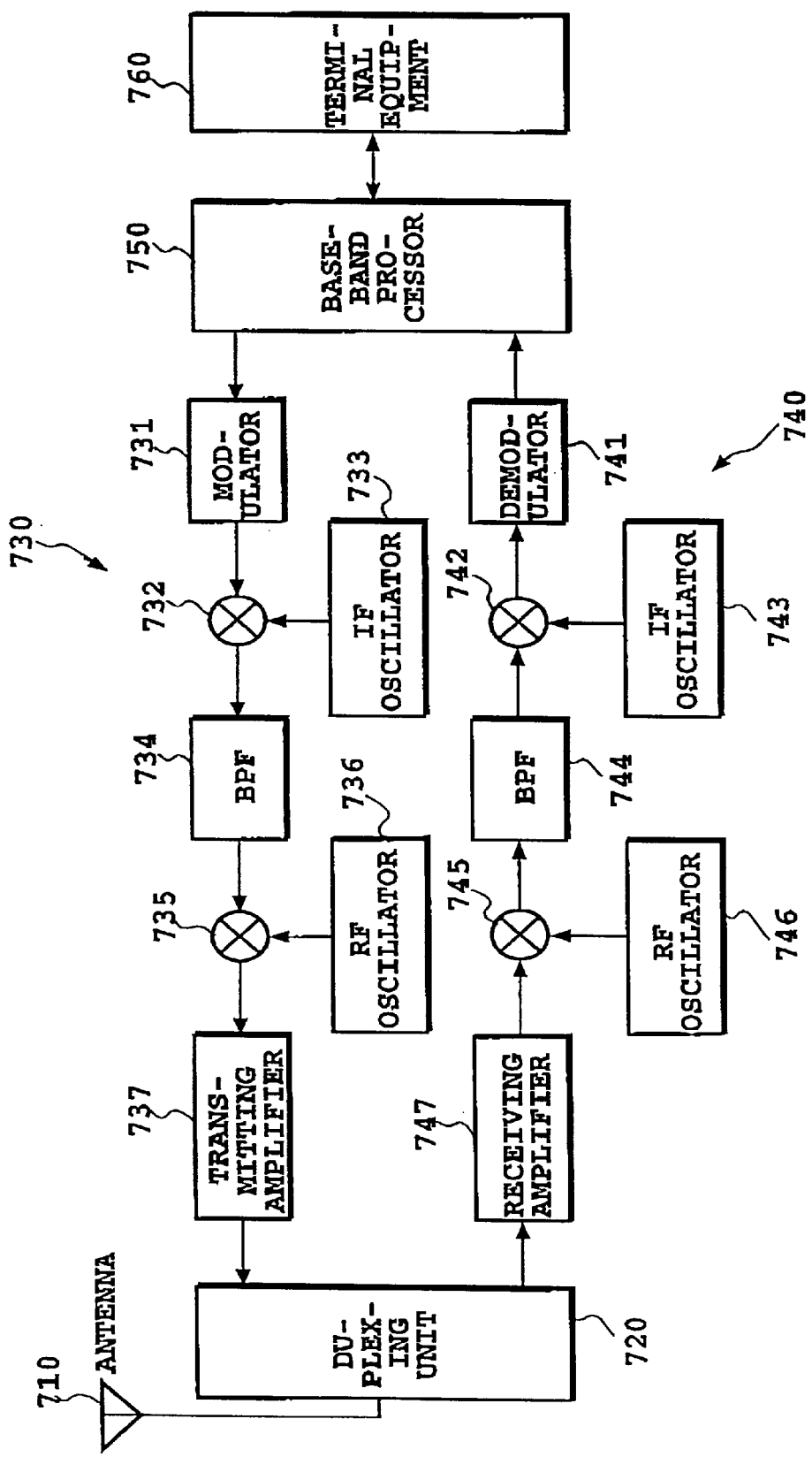
FIG. 7 is a block diagram showing a configuration of a mobile station in accordance with the present invention.

FIG. 7 is an embodiment of the mobile station in accordance with the present invention. An antenna 710 receives a radio signal transmitted by the base station, and transmits a radio signal to the base station. A duplexing unit 720 is a directional coupler for sharing the antenna 710 between transmission and reception. Reference numerals 730 and 740 designate a transmitter and a receiver, respectively. A baseband processor 750 is a conventional unit that processes a signal from terminal equipment 760 and a radio signal that is sent from the base station and received by the receiver 740. The transmitter 730 comprises a modulator 731, a mixer 732, an intermediate frequency (IF) oscillator 733, a bandpass filter (BPF) 734, a mixer 735, a radio frequency (RF) oscillator 736 and a transmitting amplifier 737. The receiver 740 comprises a demodulator 741, a mixer 742, an intermediate frequency (IF) oscillator 743, a bandpass filter (BPF)744, a mixer 745, a radio frequency (RF) oscillator 746 and a receiving amplifier 747. As easily seen, the configuration is nearly the same as that of the base station as shown in FIG. 6 except that the terminal equipment 760 is connected instead of the communications network.

As an example of the terminal equipment 760, there is a handset which comprises a speaker, a microphone and a voice codec processor. It has a function that produces sound from the speaker by converting the digital signal from the baseband processor 750 into voice, and a function that converts the voice input from the microphone into a digital signal, and supplies it to the baseband processor 750.

Because the operation of the mobile station is similar to that of the base station as shown in FIG. 6, the description of the signal processing by the mobile station will be omitted here.

Embodiment 1

An embodiment 1 can handle a problem of interference to the receiving frequency of the base station 422, which is caused by the leakage power of the mobile station 414 to the adjacent frequency as illustrated in FIG. 4. Here, an example to which CDMA is applied as a communication scheme will be described. An example of interference is illustrated in FIGS. 8 and 9.

Figure 1:
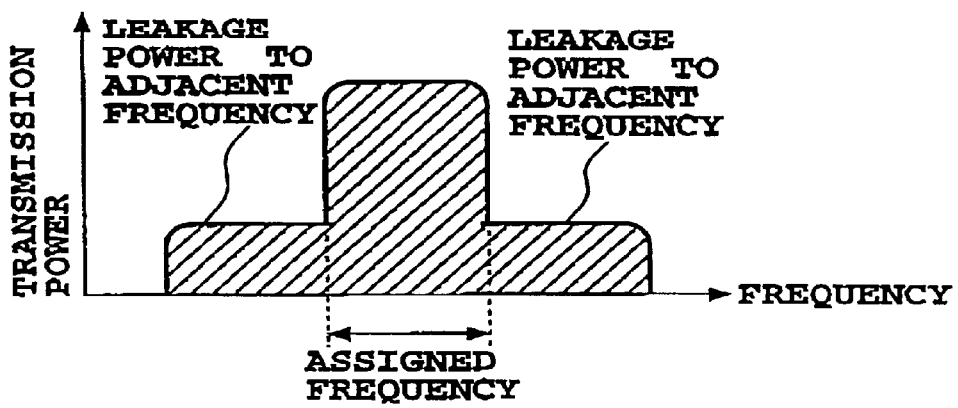
FIG. 1 is a diagram illustrating leakage power from an assigned frequency to outside frequencies in a conventional system.
Figure 2:
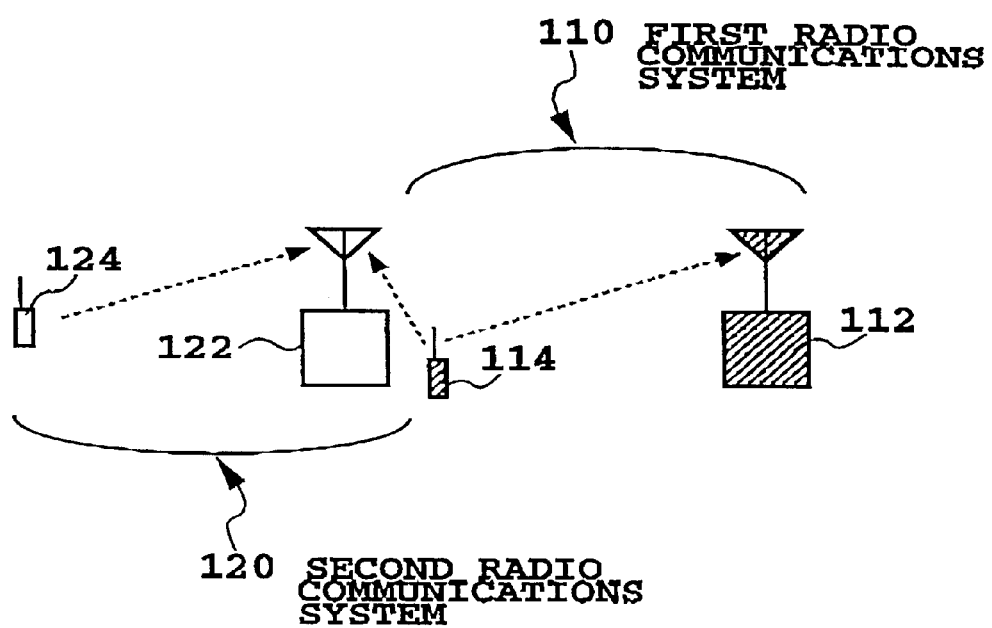
FIG. 2 is a diagram illustrating an example in which leakage power provides an adjacent frequency with large interference power in the conventional system.
Figure 3:
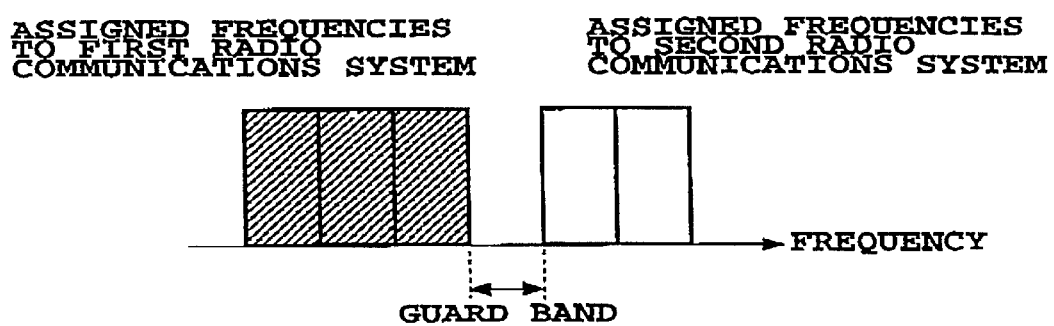
FIG. 3 is a diagram illustrating a guard band between two radio communications systems in the conventional system.
Figure 8:
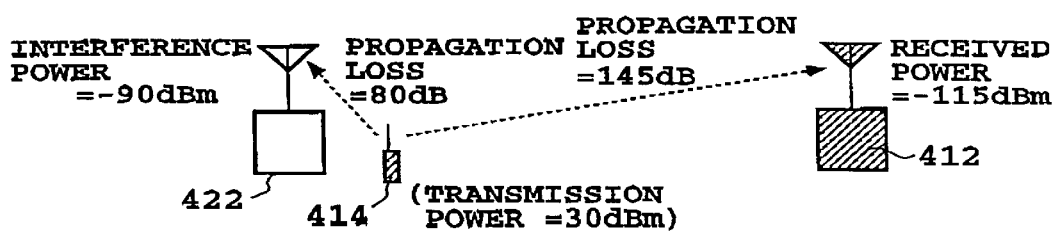
FIG. 8 is a diagram showing an example of interference of interest.

In FIG. 8, the base station 412 communicates with the mobile station 414 as in FIG. 2. At the same time, using a frequency adjacent to the frequency assigned to that communication, the base station 422 carries out its communication.

Figure 9:
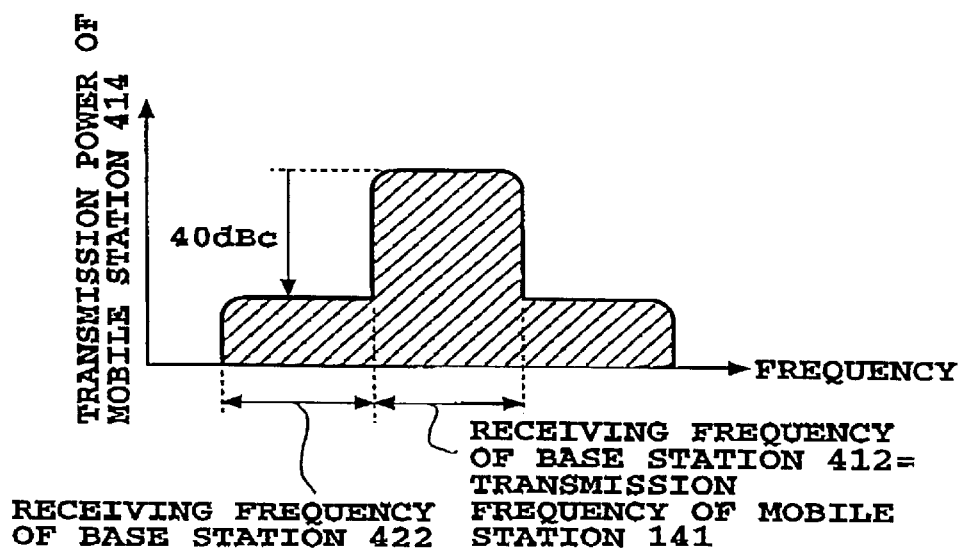
FIG. 9 is a diagram illustrating leakage power to a receiving frequency band of the base station.

FIG. 9 illustrates an example of the leakage power to the adjacent frequency during the transmission by the mobile station 414. In the example as illustrated in FIG. 9, the power attenuated by 40 dB from the transmission power at the transmission frequency of the mobile station 414 appears in the receiving frequency of the base station 422.

Figure 10:
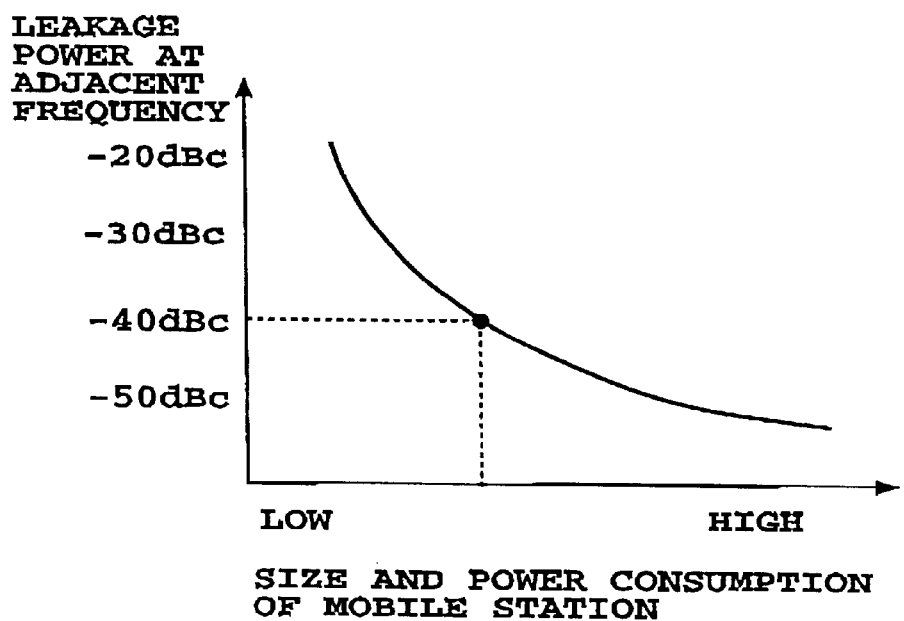
FIG. 10 is a graph illustrating relationships between the size and power consumption of a mobile station and the leakage power to an adjacent frequency.

The leakage power level is mainly determined by the distortion characteristics of the transmitting amplifier 737, transmission filter characteristics in the duplexing unit 720 and the characteristics of the BPF 734. However, as illustrated in FIG. 10, the size and power consumption of the mobile station is inversely proportional to the leakage power to the adjacent frequency. Thus, the leakage power to the adjacent frequency must be allowed to some extent to reduce the size and power consumption of the mobile station.

Let us assume in the example as shown in FIG. 8 that the processing gain=20 dB, and interference power at the base station 412 is −105 dBm. The received power at the base station 412 from the mobile station 414 can be obtained by subtracting the propagation loss (145 dB) from the transmission power (30 dBm), which results in −115 dBm. Thus, the received SIR (Signal to Interference power Ratio) is −115 dBm−(−105 dBm −20 dBm)=10 dB. On the other hand, the leakage power to the adjacent frequency caused by the transmission by the mobile station 414 is 30 dBm−40 dBm=−10 dBm; On the basis of this, and considering the propagation loss of 80 dBm (since the mobile station 414 is closer to the base station 422 than to the base station 412, the propagation loss to the base station 422 is less), the interference power at the base station 422 is −90 dBm. Because the value is greater than the interference power (−105 dBm) of the base station 412 by 15 dBm, a mobile station linked with the base station 422 must increase its transmission power by that amount. Thus, some of the mobile stations linked to the base station 422, which carry out their communications at transmission power close to the maximum transmission power, will suffer the influence of the interference from the mobile station 414, which causes the degradation in communication quality and disconnection of the communications.

To avoid such interference, the present embodiment halts the transmission from the mobile station 414. The radio communications system has a function to disconnect the radio channel when a bad reception quality continues. For example, in the configuration of the mobile station as shown in FIG. 7, the baseband processor 750 continuously measures an error rate by detecting errors in the received signal, and makes a decision that the reception quality falls below a threshold level when the error rate exceeds a predetermined level, thereby halting the communication (disconnect the channel, for example) Alternatively, the demodulator 741 in FIG. 7 measures the received SIR so as to halt the communication when the received SIR falls below a threshold level. The conventional radio communications system usually has a function to monitor the reception quality and halt the communication. The present invention can utilize the function to stop the transmission of the mobile station 414. The operation of the present embodiment 1 will now be described with reference to FIG. 11.

Figure 11:
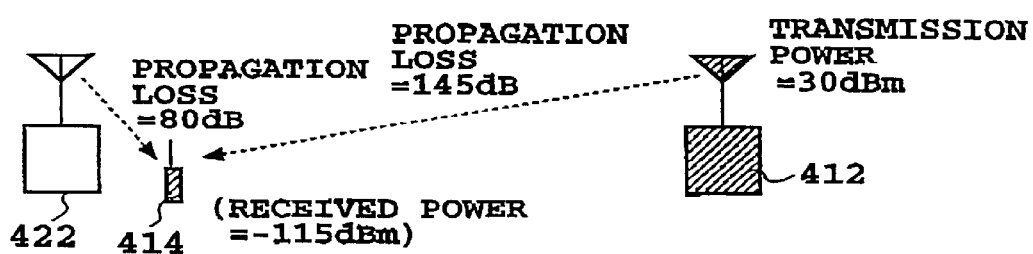
FIG. 11 is a diagram illustrating received power and interference power in the mobile station.

In FIG. 11, the mobile station 414 provides the base station 422 with interference as in FIG. 8, in which case, the base station 422 transmits an interfering signal to the receiving frequency of the mobile station 414. Assume that the transmission power from the base station 412 to the mobile station 414 is 30 dbm, the processing gain=20 dB and the interference power at the mobile station 414 is −105 dBm. Then, the received SIR at the mobile station 414 is calculated as −115 dBm−(−105 dBm−20 dBm) =10 dBm. Let us further assume that the maximum transmission power from the base station 412 to the mobile station 414 is 35 dBm, and the communication is disconnected when the received SIR at the mobile station 414 is equal to or less than 3 dBm, in which case, the base station 422 transmits the interfering signal to the receiving frequency of the mobile station 414.

When the base station 422 transmits the interfering signal of −10 dBm, for example, the interference power at the mobile station 414 increases by −90 dBm, and the received SIR becomes equal to or less than −5 dBm. Even if the base station 412 increases its transmission power to the maximum transmission power, the received SIR is equal to or less than 0 dBm, and hence the communication is halted. Thus, the interference from the mobile station 414 to the base station 422 is halted, ensuring the reception quality at the base station 422.

A configuration for transmitting the interfering signal from the base station will now be described. As described before, the leakage power to the adjacent frequencies is inversely proportional to size of the device. Because the requirement for the size of the base station is less severe than that for the mobile station, the size of the base station is accepted to some extent to limit the leakage power to the adjacent frequency to a low level. In the present embodiment 1, however, the base station must send the interfering signal to the adjacent frequency. Accordingly, in the base station as shown in FIG. 6, the distortion characteristic of the transmitting amplifier 637, the transmission filter characteristic in the duplexing unit 620 and the characteristic of the BPF 634 are varied so that the required interfering signal can be transmitted at the adjacent frequency.

In this way, in the present embodiment 1, the base station continuously transmits the leakage power, which is proportional to the transmission power at the frequency assigned to the base station, at the receiving frequency of the adjacent mobile station (adjacent frequency).

Embodiment 2

Figure 12:
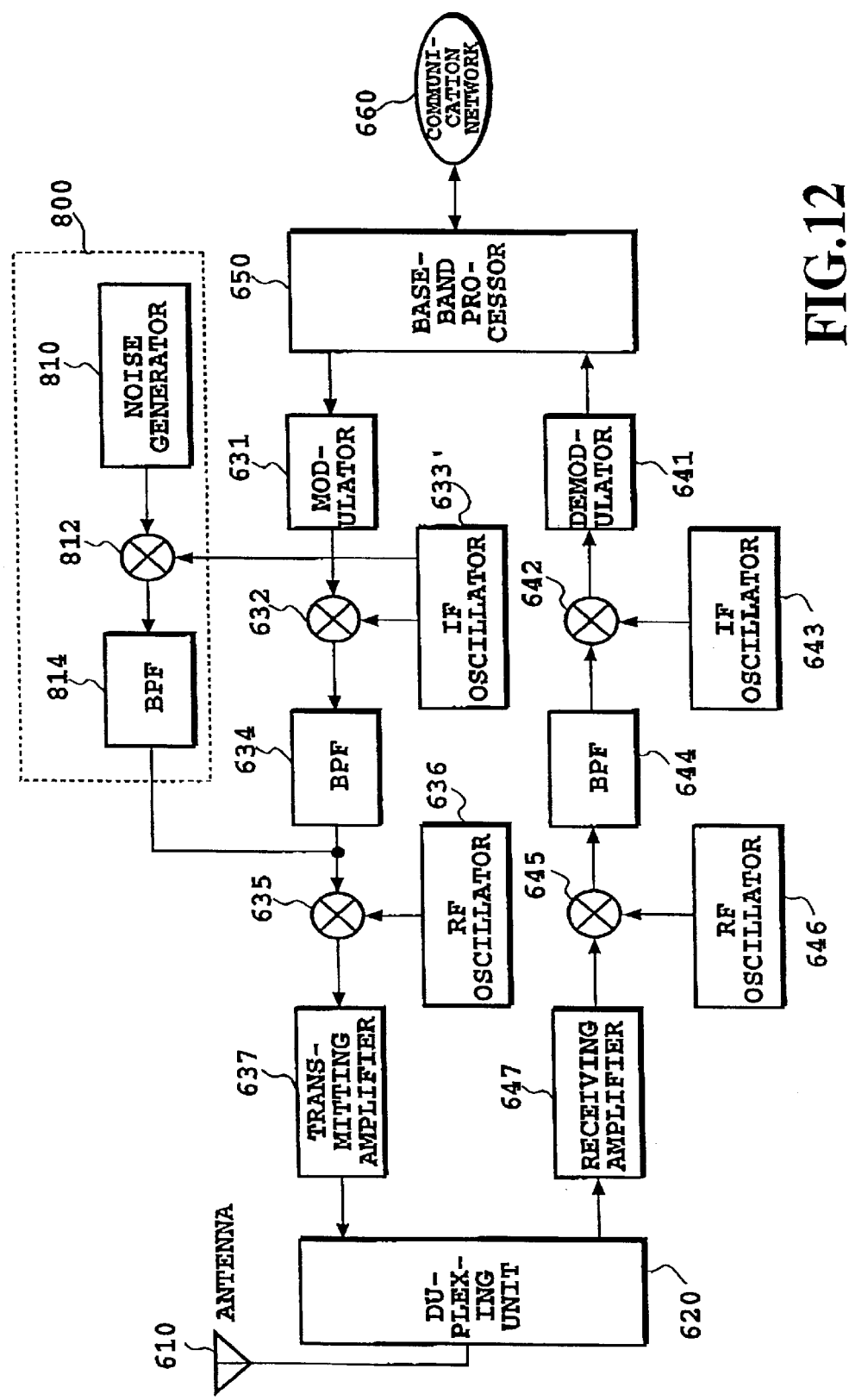
FIG. 12 is a block diagram showing a configuration of the base station in accordance with the present invention, which can generate and transmit noise.

In the embodiment 1, the base station continuously transmits, at the receiving frequency of the adjacent mobile station, the leakage power of the level as described above. A simple configuration is shown in FIG. 12 for transmitting a desired level of power to provide the interference to the receiving frequency of the adjacent mobile station. In FIG. 12, a transmitter 800 is added to the configuration of the base station as shown in FIG. 6. This makes it possible for the base station to transmit a radio signal with an appropriate magnitude to provide the interference to the receiving frequency band of the adjacent mobile station independently of the transmission power of its frequency. In FIG. 12, the like portions to those of FIG. 6 are designated by the same reference numerals In FIG. 12, the transmitter 800 comprises a noise generator 810, a mixer 812 and a bandpass filter 814. The mixer 812 converts the noise generated by the noise generator 810 to an IF signal using a signal fed from an IF oscillator 633'. The IF oscillator 633' can also oscillate the frequency which deviates by the difference between the frequency assigned to the base station and the receiving frequency of the adjacent mobile station (that is, the difference between the transmission frequencies of the base stations 422 and 412 in FIG. 5). Therefore, the passband of the BPF 814 is deviated from that of the BPF 634 by that amount. The output of the BPF 814 is converted through the mixer 635 and RF oscillator 636 into a signal with the receiving frequency of the adjacent mobile station, and is transmitted through the transmitting amplifier 637, duplexing unit 620 and the antenna 610. The transmitting amplifier 637 and the transmission filter in the duplexing unit 620 have characteristics that can transmit the adjacent frequency as described in the embodiment 1.

Thus providing the base station with the second transmitter 800 makes it easier for the base station to transmit at the receiving frequency of the adjacent frequency the interfering signal with an appropriate magnitude for halting the transmission by providing the interference to the mobile station.

Embodiment 3

In the embodiments 1 and 2, the base station continuously transmits the interfering signal of a certain magnitude at the receiving frequency of the adjacent mobile station. In contrast with this, in the present embodiment 3 as shown in FIG. 13, the base station transmits the interfering signal at the receiving frequency of the adjacent mobile station as necessary.

Figure 13:
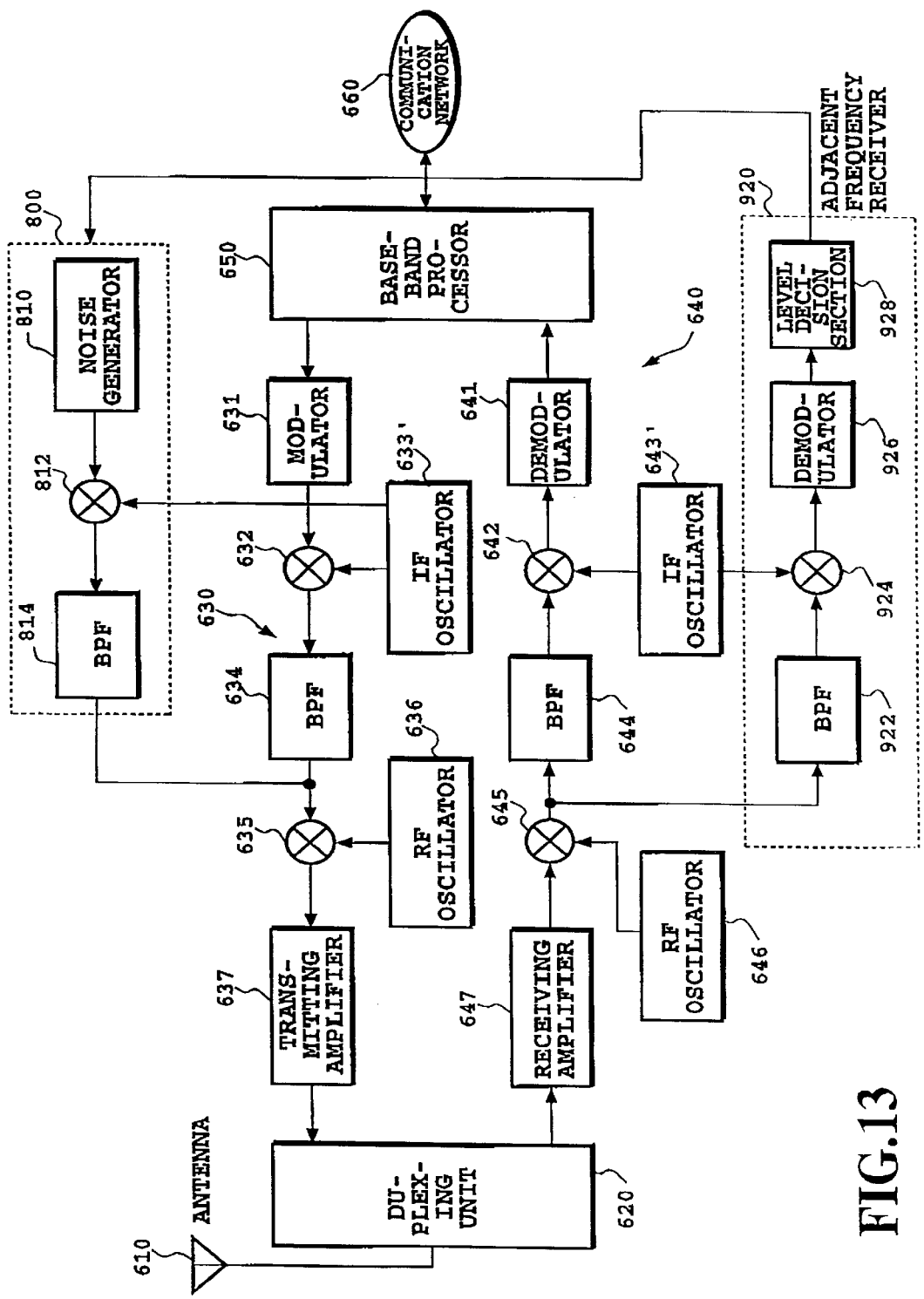
FIG. 13 is a block diagram showing a configuration of the base station in accordance with the present invention, which can measure the received signal level at the adjacent frequency.

FIG. 13 shows a base station corresponding to the base station as shown in FIG. 12 plus a level measuring receiver 920 for measuring the level of the received signal at the adjacent frequency. In FIG. 13, like portions to those of FIG. 12 are designated by the same reference numerals.

In FIG. 13, a bandpass filter (BPF) 922 of the level measuring receiver 920 is supplied with the received signal converted into the IF frequency by the RF oscillator 646 and mixer 645, and extracts a signal of the adjacent frequency. The signal is converted into a baseband signal using an IF oscillator 643' and a mixer 924. The IF oscillator 643' can also generate the frequency deviated by an amount corresponding to the adjacent frequency. A demodulator 926 demodulates the output of the mixer 924 and measures its level. A level decision section 928 compares the level with a predetermined level. When it is found as a result of the comparison that the level of the received signal at the adjacent frequency is higher than the predetermined level, the transmitter 800 is activated. Thus, the transmitter 800 transmits the interfering signal of the appropriate level to the adjacent frequency band as described before.

Assume in FIG. 13 that the leakage power to the adjacent frequency is lower than the transmission power by 40 dB during the transmission of the mobile station, then, the interference power which is lower by 40 dB than the received signal level at the adjacent frequency, is added to the signal at the receiving frequency. Therefore, if the acceptable level of the interference power from the adjacent frequency in the base station is −100 dBm, the base station starts to transmit from the transmitter 800 the interfering signal to the adjacent frequency when the level measuring receiver 920 makes a decision that the received signal level of the radio communications system exceeds −60 dBm. The interference cause by the interfering signal transmitted halts the communication of the mobile station at the adjacent frequency, thereby reducing the interference power from the adjacent frequency.

Embodiment 4

Figure 14:
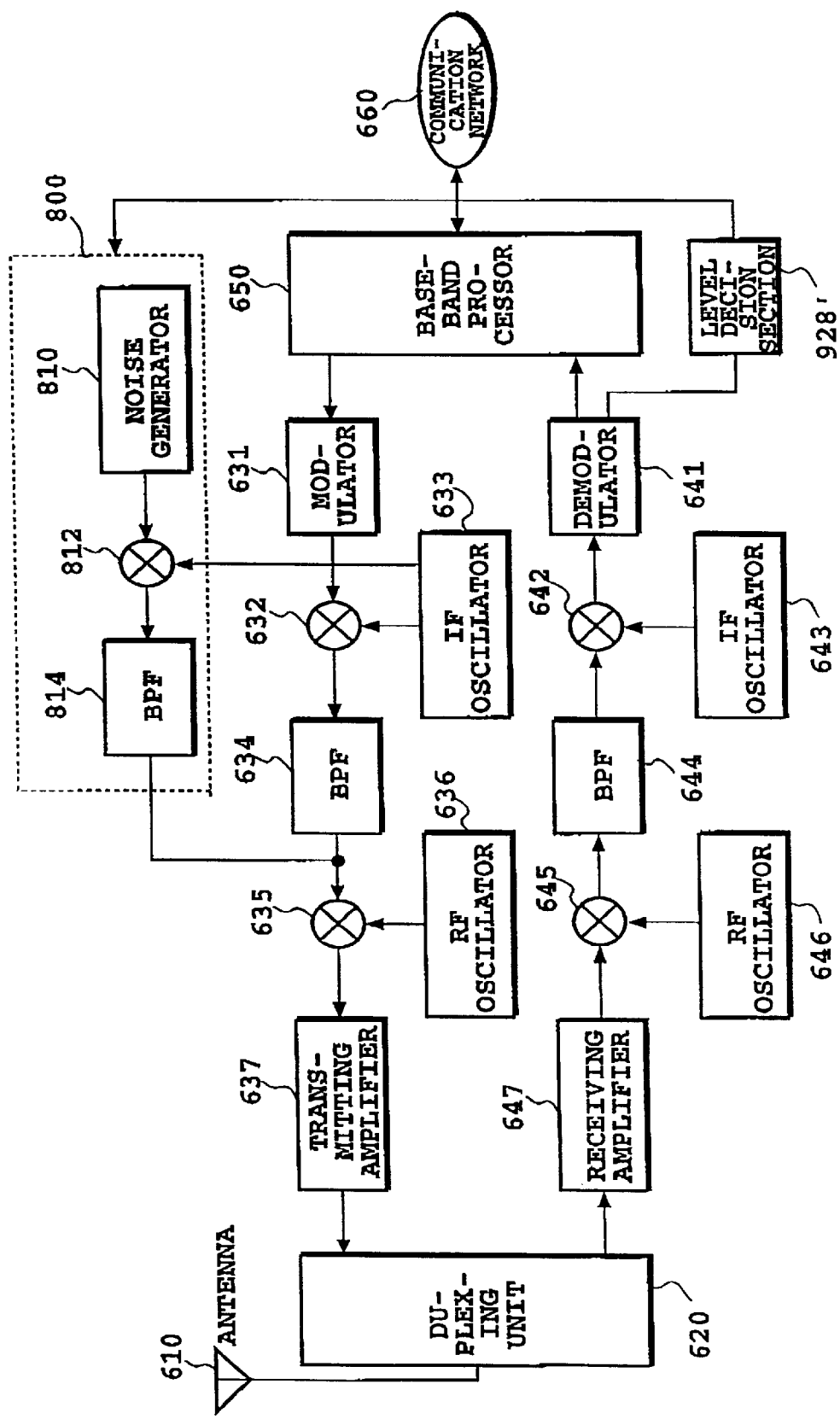
FIG. 14 is a block diagram showing a configuration of the base station in accordance with the present invention, which can estimate the received signal level of the adjacent frequency.

Although the base station has the receiver for measuring the received signal level of the adjacent frequency in the embodiment 3, the present embodiment 4 as shown in FIG. 14 can estimate the interference level without installing such level measuring receiver.

The base station of the present embodiment 4 is configured as shown in FIG. 14, in which like portions to those of FIG. 12 are designated by the same reference numerals. In FIG. 14, the demodulator 641 measures the interference level. The interference level measured undergoes the level decision by a level decision section 928' as will be described below. If it is found as a result of the level decision that the interference takes place from the mobile station using the adjacent frequency, the base station activates the transmitter 800 to start the transmission of the interfering signal at the adjacent frequency, thereby halting the transmission of the mobile station causing the interference. This will be described in more detail with reference to FIG. 15.

Figure 15:
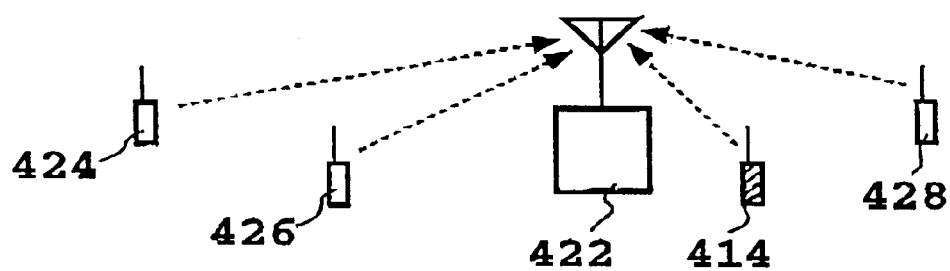
FIG. 15 is a diagram illustrating uplink interference.

In FIG. 15, the base station 422 conducts communications with mobile stations 424, 426 and 428. To reduce the interference in the CDMA radio communications system, the transmission power control is carried out such that the received signal level at the base station does not exceed a certain level. For example, let us assume that the total received signal level at the base station 422 is controlled such that it is limited up to the thermal noise level plus 10 dB. Thus, if the measured result of the interference level exceeds the thermal noise level plus 10 dB, the interference from another radio communications system is expected. For example, when the mobile station 414 belonging to another radio communications system causes large interference to the base station 422, the interference level at the base station 422 will exceed the thermal noise level plus 10 dB. Accordingly, using the +10 dB as the reference of the level decision, the leakage power from the mobile station using the adjacent frequency can be estimated.

By thus measuring the interference level, the base station 422 can transmit the interfering signal to the adjacent frequency. In response to the interference, the mobile station 414 halts its transmission at the adjacent frequency. As a result, the interference power from the adjacent frequency is reduced.

Embodiment 5

In the foregoing embodiments 1–4, the interfering signal generated by the base station halts the transmission of the mobile station that conducts its communication using the adjacent frequency. In contrast with this, in the present embodiment 5, the mobile station detects that it provides interference to the base station carrying out communication at the adjacent frequency, and halts its transmission.

Figure 16:
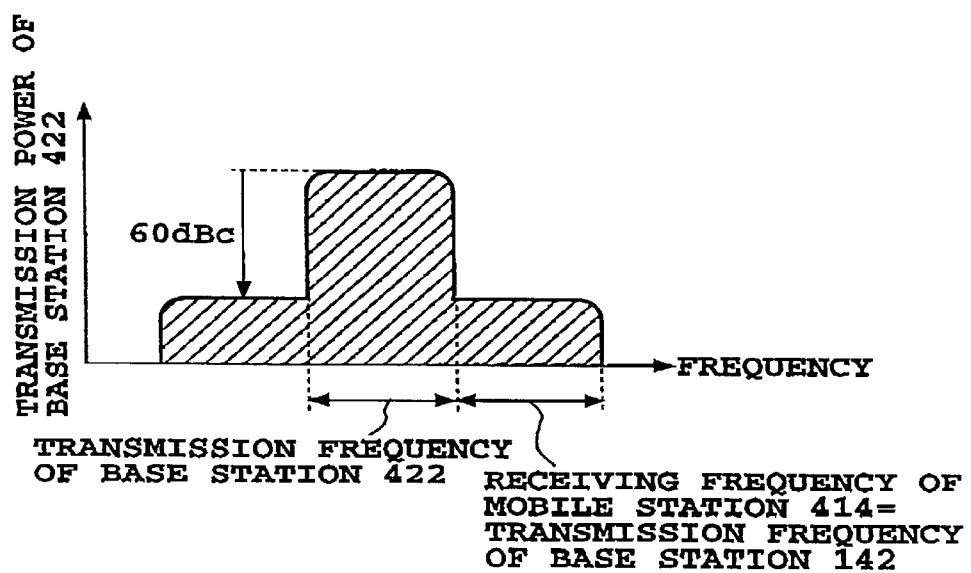
FIG. 16 is a diagram illustrating leakage power from the base station to the receiving frequency band of the mobile station.

In the states as shown in FIGS. 8 and 11, the mobile station 414 causes large interference to the base station 422. Assume that the leakage power from the base station 422 to the receiving frequency of the mobile station 414 is as shown in FIG. 16, and that the total transmission power of the base station 422 is 40 dBm. Then, the received signal level of the mobile station 414 at the adjacent frequency is −100 dBm (=40 dBm−60 dBm−80 dBm) taking account of the propagation loss of 80 dB. Accordingly, when the acceptable interference level is −110 dBm, for example, the mobile station 414 must halt its transmission.

The acceptable interference level MS_LEV at the adjacent frequency measured by the mobile station can be determined as follows.

$$MS\_LEV = BS\_POW - BS\_ATT - BS\_LEV + MS\_ATT - MS\_POW \quad (1)$$

where

MS_LEV: Acceptable level of interference at adjacent frequency measured by mobile station;

BS_POW: Total transmission power of base station;

BS_ATT: Attenuation amount of adjacent frequency leakage power with respect to base station transmission power (>0);

BS_LEV: Acceptable level of interference from adjacent frequency at base station;

MS_ATT: Attenuation amount of adjacent frequency leakage power with respect to mobile station transmission power (>0); and MS_POW: Transmission power of mobile station.

Thus determining the MS_LEV enables the mobile station to estimate from the received signal level of the adjacent frequency measured by the mobile station the interference level at the base station, and to make a decision on halting its transmission.

Figure 17:
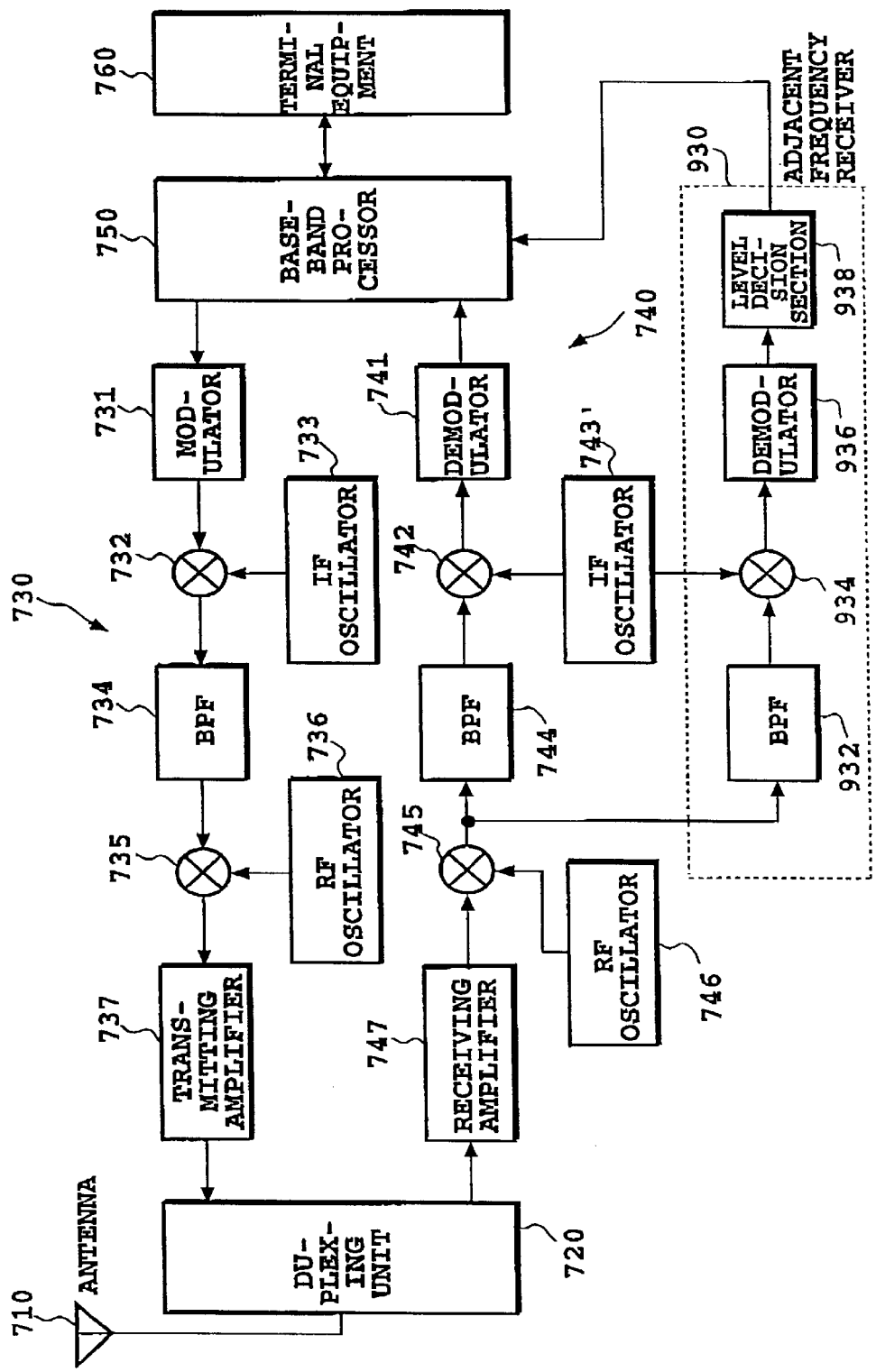
FIG. 17 is a block diagram showing a configuration of the mobile station in accordance with the present invention, which can measure the received signal level of the adjacent frequency.

An example is shown in FIG. 17 in which the mobile station measures the received signal level of the adjacent frequency. In FIG. 17, like portions to those of FIG. 7 are designated by the same reference numerals.

In FIG. 17, the received signal converted into the IF signal by the RF oscillator 746 and mixer 745 is supplied to an adjacent frequency receiver 930. The adjacent frequency receiver 930 extracts the signal of the adjacent frequency using a bandpass filter 932, an IF oscillator 743' and a mixer 934. The signal is supplied to a demodulator 936 to measure its level, and a level decision section 938 carries out the level decision described above. The decision output is supplied to the baseband processor 750 which makes a decision from the decision result as to whether to halt the transmission from the mobile station or not.

The configuration makes it possible to reduce the interference to the base station caused by the leakage power from the mobile station using the adjacent frequency.

Embodiment 6

Figure 18:
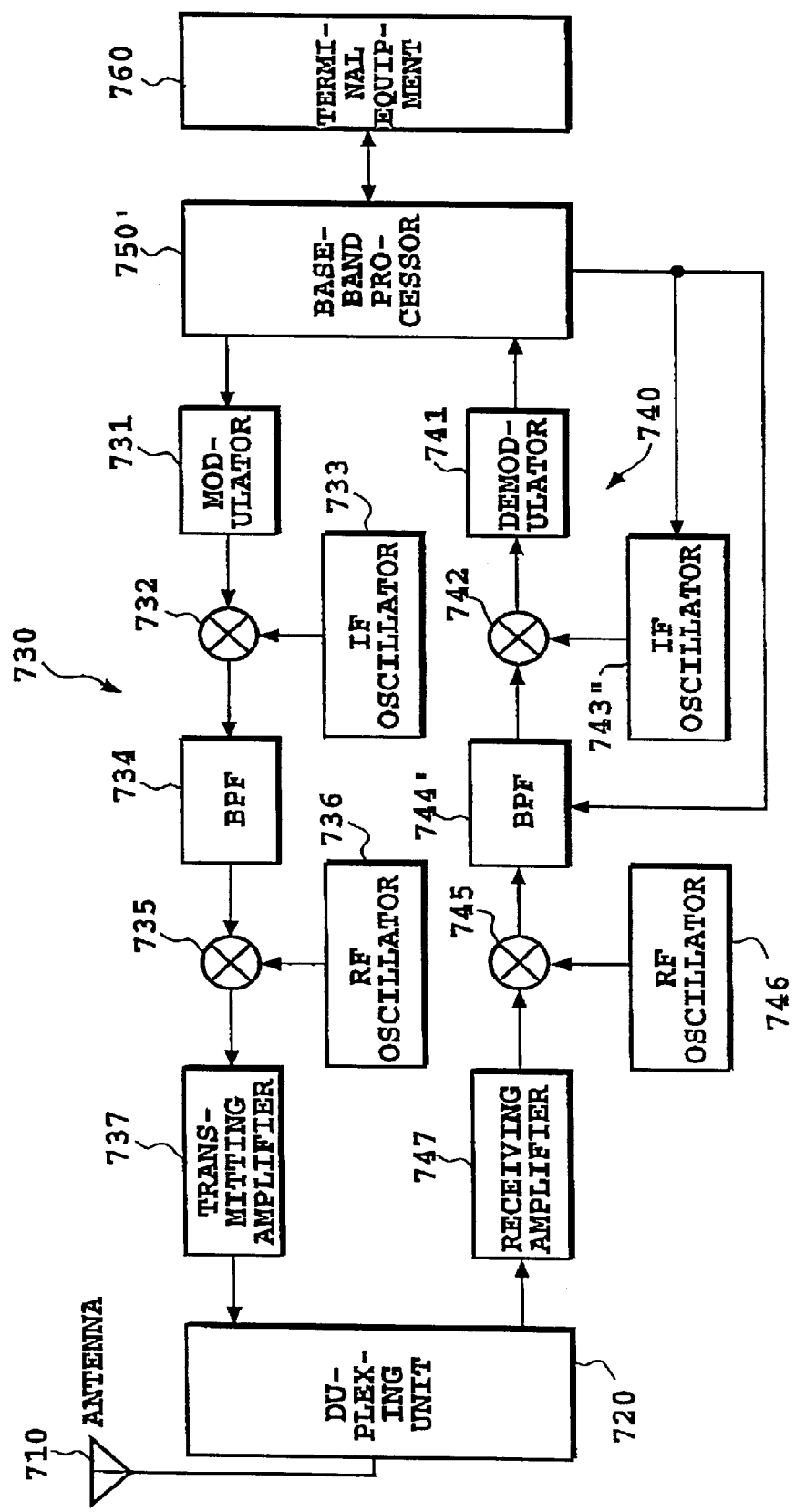
FIG. 18 is a block diagram showing another configuration of the mobile station in accordance with the present invention, which can measure the received signal level of the adjacent frequency.

In the present embodiment 6 as shown in FIG. 18, the mobile station estimates the interference to the base station communicating at the adjacent frequency band, and halts its transmission as in the embodiment 5. Although it is necessary for the mobile station in the embodiment 5 to comprise the receiver for receiving the adjacent frequency signal, the mobile station in the present embodiment 6 receives the adjacent frequency signal when no reception is necessary in the standby mode or in the communication mode, and estimates the interference to the base station by the mobile station itself. In FIG. 18, like portions to those of FIG. 7 are designated by the same reference numerals.

In the mobile station as shown in FIG. 18, the baseband processor 750' commands, when no reception is required in the standby mode or in the communication mode, the bandpass filter 744' to change the passband frequency and the IF oscillator 743" to change its oscillation frequency, thereby changing the receiving frequency of the mobile station from its assigned frequency to the adjacent frequency. The demodulator 741 measures the received signal level of the adjacent frequency signal received, and supplies it to the baseband processor 750' which makes a decision on whether to halt the transmission from the mobile station or not in response to the measured result.

Although the present invention is explained by way of example of avoiding the interference between the two radio communications systems in the foregoing embodiments 1–6, the present invention can also be applied to the case where three or more radio communications systems intermingle in the same area. Furthermore, the present invention is applicable to the case where a single radio communications system includes micro-cell layer and macro-cell layer which use different frequencies, and cannot conduct handover (switching of a radio channel during communication) between a micro-cell and a macro-cell, in order to avoid the interference between the micro-cell and macro-cell.

INDUSTRIAL APPLICABILITY

As described above, according to the present invention, to suppress the uplink interference from a mobile station in an external system when two or more radio communications systems intermingle in the same area, the transmission from the mobile station causing the interference can be halted.

Thus, according to the present invention, the interference from the mobile station in the external system can be prevented without providing the guard bands, which can increase the frequency utility efficiency without degrading the communication quality.

What is claimed is:

1. A mobile station in a radio communications system which includes at least one base station and at least one mobile station, the radio communications system being one of a plurality of the radio communications systems existing in one geographical area, each of which uses different frequencies, in which the mobile station, when in a communication mode, is associated with one of the radio communications systems, and cannot change that association during the communication mode, said mobile station comprising:

means for measuring a received signal level of a received signal at a frequency adjacent to its own assigned frequency by switching a frequency during a period in which no reception is required in a standby mode and in the communication mode; and means for halting its transmission when the received signal level exceeds an acceptable level.

* * * * *